United States Patent
Fujii et al.

(10) Patent No.: US 6,446,496 B1
(45) Date of Patent: Sep. 10, 2002

(54) SURFACE TEXTURE MEASURING INSTRUMENT

(75) Inventors: Nobuyoshi Fujii; Satoshi Ueda, both of Kure; Futoshi Doi, Kawasaki, all of (JP)

(73) Assignee: Mitutoyo Corporation, Kawasaki (JP)

( * ) Notice: Subject to any disclaimer, the term of this patent is extended or adjusted under 35 U.S.C. 154(b) by 35 days.

(21) Appl. No.: 09/695,999

(22) Filed: Oct. 26, 2000

(30) Foreign Application Priority Data

Nov. 1, 1999 (JP) .......................... 11-310940

(51) Int. Cl.⁷ .......................... G01B 21/20; G01B 21/30
(52) U.S. Cl. .............................. 73/105; 33/559; 33/561
(58) Field of Search ..................... 73/104, 105; 33/551, 33/553, 534, 558, 558.04, 559, 561, 558.01

(56) References Cited

U.S. PATENT DOCUMENTS

| | | | | |
|---|---|---|---|---|
| 2,330,801 A | * | 10/1943 | Abbott | 73/105 |
| 2,345,022 A | * | 3/1944 | Williamson | 73/105 |
| 3,158,022 A | * | 11/1964 | Rawstron et al. | 73/105 |
| 3,283,568 A | * | 11/1966 | Reason | 73/105 |
| 4,552,014 A | * | 11/1985 | Berchtold | 73/105 |
| 4,776,212 A | | 10/1988 | Parsons et al. | 73/105 |

FOREIGN PATENT DOCUMENTS

JP         11-190621         7/1999

* cited by examiner

*Primary Examiner*—Daniel S. Larkin
(74) *Attorney, Agent, or Firm*—Oliff & Berridge, PLC

(57) ABSTRACT

A surface texture measuring instrument has a pre-load leaf spring (41, 42) for biasing a detector (10) having a skid (14) at a distal end thereof, a pre-load force controller (47) for controlling a pre-load force of the pre-load leaf spring (41, 42), and a stopper (50) for restricting movement of the detector (10) in a biasing direction when a predetermined pre-load force is applied to the detector (10) by the pre-load force controller (47). In conducting a skidless measurement, the detector (10) is locked by applying the predetermined pre-load force to the detector (10) by the pre-load force controller (47). In conducting a skid measurement, the pre-load force less than the predetermined value is applied to the detector (10) by the pre-load force controller (47).

5 Claims, 4 Drawing Sheets

F I G. 2
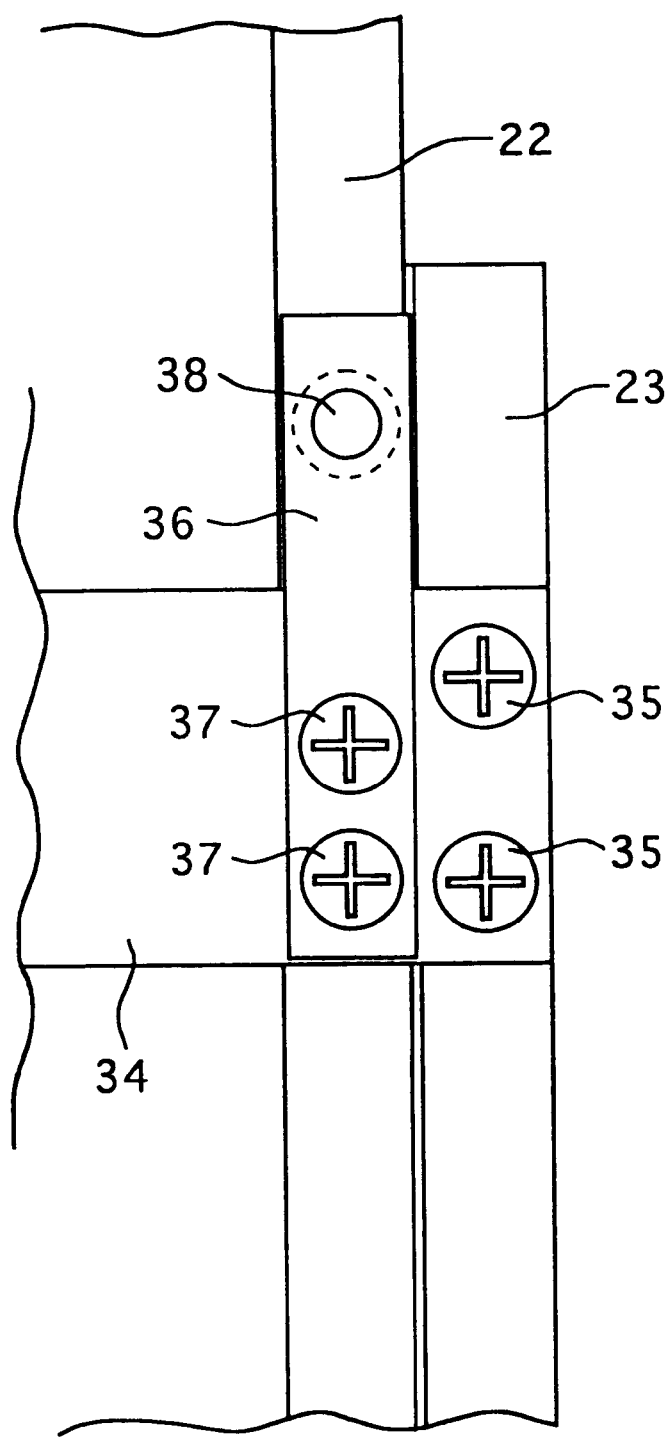

SURFACE TEXTURE MEASURING INSTRUMENT

BACKGROUND OF THE INVENTION

1. Field of Invention

The present invention relates to a surface texture measuring instrument for measuring a surface roughness, waviness and profile of a workpiece by moving a detector having a stylus and a skid at a distal end thereof along a measurement surface.

2. Description of Related Art

A surface texture measuring instrument has a detector having a stylus at a distal end thereof and a drive unit for moving the detector along a measurement surface, where the stylus is in contact with the measurement surface to detect displacement of the stylus as a measurement data.

The stylus is attached to a detector body in a seesawing manner, and a skid is attached to the detector body to cover a distal end of the stylus. The skid is attached to the detector body by a bolt so that the skid is detachable from the detector body.

During measurement with skid (referred to "skid measurement" hereinafter), the skid is fixed to the detector body for conducting measurement. Such skid measurement is used in order to remove the waviness component and to detect only the roughness component data when the measurement surface has both the waviness and the roughness. During the measurement, the detector is moved while both the stylus and the skid are in contact with the measurement surface.

During the skid measurement, the skid has to be constantly in contact with the measurement surface. Accordingly, the detector and the drive unit are conventionally connected by a leaf spring, so that the skid is pressed toward the measurement surface by the leaf spring (Japanese Patent Application Laid-Open Publication No. Hei 11-190621).

Skidless measurement with the skid detached from the detector body is used for measuring cross section and straightness of the workpiece by detecting all of concavo-convex data of the measurement surface including waviness etc. During the skidless measurement, the detector is moved while only the stylus is in contact with the measurement surface.

In the conventional arrangement, the skid measurement is conducted by fixing a skid to the detector body by a bolt and the skidless measurement is conducted by detaching the skid from the detector body.

In a surface texture measuring instrument, the skid has to be exchanged into a skid of different type.

In this case, it is desirable to change the pressing force of the skid toward the measurement surface. However, since the leaf spring for pressing the skid at the distal end of the detector presses the measurement surface and has a constant spring force, such demand has not been sufficiently met.

SUMMARY OF THE INVENTION

An object of the present invention is to provide a surface texture measuring instrument capable of easily switching the skid measurement and the skidless measurement and capable of controlling a pressing force of the skid toward the measurement surface.

For attaining the above object, in the present invention, a force for biasing the detector is controlled and movement of the detector in a pre-load force direction is restricted for conducting the skidless measurement.

More specifically, a surface texture measuring instrument according to the present invention is characterized in having a detector with a stylus for measuring the surface texture and a detachable skid at a distal end thereof; a drive unit for moving the detector along a measurement surface; a pre-load means for biasing the detector to press the skid onto the measurement surface; a pre-load force controller for controlling a pre-load force of the pre-load means; and a restriction means for restricting a movement of the detector in a direction of the pre-load force when the pre-load force controller applies a predetermined pre-load force to the detector, thus conducting the skidless measurement.

In the present invention, in order to conduct the skidless measurement, a predetermined pre-load force is applied to the detector by the pre-load force controller.

Then, the skid does not move on account of a great pre-load force caused to the detector even when a force opposite to the biasing direction is applied. Further, since the movement of the detector in the biasing direction is restricted by the restriction means, the skid does not move in the biasing direction, thus being "locked".

In the above condition, the detector is moved by the drive unit while the stylus is in contact with the measurement surface, so that all the concavo-convex data on the measurement surface is detected.

On the other hand, for conducting the skid measurement, a pre-load force less than the predetermined value is applied to the detector by the pre-load force controller.

Then, though the skid is biased by the pre-load force caused to the detector, the movement in the biasing direction is not restricted by the restriction means.

In the above condition, when the detector is moved by the drive unit while the skid and the stylus are in contact with the measurement surface, the skid is displaced along the waviness on the measurement surface, and the displacement of the stylus relative to the skid is detected as a data, such as surface roughness.

Then, the pre-load force controller is operated to adjust the pre-load force applied to the detector when the skid is exchanged into a different type skid.

Accordingly, the pre-load force applied to the detector can be controlled by the pre-load force controller, thus easily controlling the pressing force against the measurement surface of the skid.

Furthermore, since the skidless measurement can be conducted while restricting the movement of the detector toward the biasing direction when the predetermined pre-load force is applied to the detector, the skid measurement and the skidless measurement can be easily switched by operating the pre-load force controller.

In the present invention, the pre-load means may preferably include a holding pre-load means for holding the detector and a pressing pre-load means for pressing the detector against the measurement surface.

According to the above arrangement, since the minimum required pre-load force is obtained by the holding pre-load means and the adjusting pre-load force can be controllably applied by the pressing pre-load means, the pre-load force of the detector can be easily adjusted.

In the present invention, the holding pre-load means and the pressing pre-load means may preferably be first and second leaf springs with the first ends secured to either one of the detector or the drive unit at a predetermined gap and the second ends attached to the other one of the detector or the drive unit. The pre-load force controller is an adjustment screw for moving the second end of the second leaf spring toward and away from the first leaf spring to adjust the pre-load force of the detector against the measurement surface, and the restriction means is a stopper for restricting the movement of the detector in a biasing direction of the detector when the pre-load force of the detector is increased by screwing in the adjustment screw.

According to the above arrangement, since the second end of the second leaf spring comes adjacent to the second end of the first leaf spring by screwing in the adjustment screw, a pre-load force (spring force) for moving the first end of the second leaf spring away from the first end of the first leaf spring is applied, thus applying a great pre-load force onto the detector. Then, a great pressing force is applied to the skid in contact with the measurement surface, on account of the pre-load force applied to the detector.

When the adjustment screw is screwed at the maximum, the pre-load force of the detector relative to the drive unit is enlarged and the movement of the detector toward the biasing direction is restricted by the stopper, thus locking the detector.

Accordingly, in the above arrangement, the two pre-load means for holding and pressing are composed of the leaf springs, thus the structure of the pre-load means can be simplified.

Further, since the pre-load force controller is composed of the screw member, the pre-load force can be easily controlled by adjusting a screwing amount of the screw.

In the present invention, the surface texture measuring instrument may preferably have an auxiliary pre-load means for biasing the skid toward the measurement surface.

According to the above arrangement, the pre-load force of the detector can be minutely adjusted by the auxiliary pre-load means in addition to the pre-load means.

Further, by constructing the auxiliary pre-load means with a helical spring provided between the detector and the drive unit, the structure of the device can be simplified.

BRIEF DESCRIPTION OF THE DRAWINGS

FIG. 2 is a view seen from a direction arrowed by II in FIG. 1;

DETAILED DESCRIPTION OF PREFERRED EMBODIMENTS

An embodiment of the present invention will be described below with reference to attached drawings.

Figure 1:
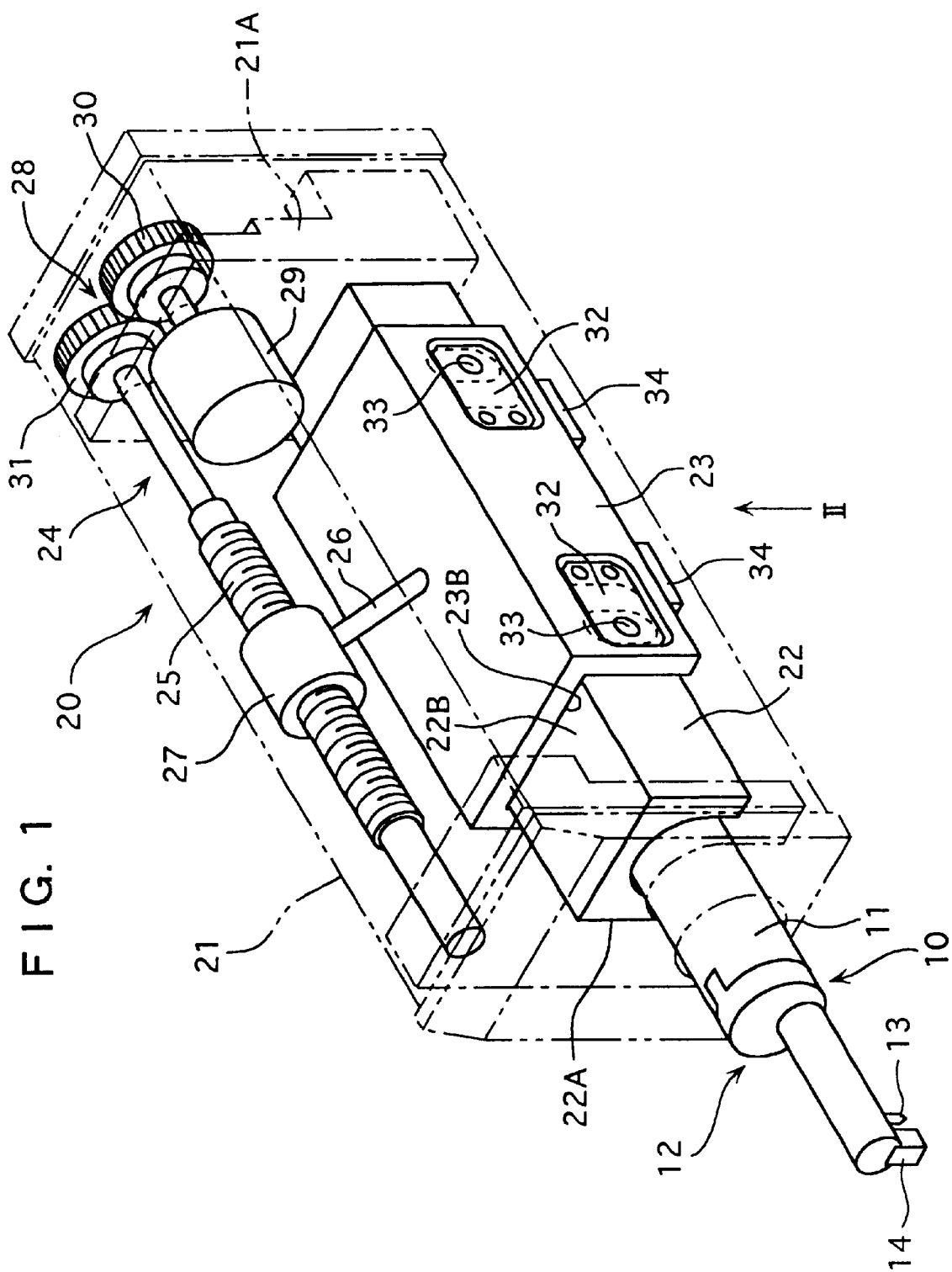
FIG. 1 is a perspective view showing summarized arrangement of an embodiment of the present invention.

FIG. 1 is a summarized perspective view showing a surface texture measuring instrument according to an embodiment of the present invention.

In FIG. 1, the surface texture measuring instrument according to the present embodiment has a detector 10 for measuring a texture of a measurement surface of a workpiece and a drive unit 20 for advancing and retracting the detector 10 along the measurement surface.

The drive unit 20 has a slider guide 22 having an approximate bridge-type cross section fixed along longitudinal direction of a box-shaped casing 21, a slider 23 provided to the slider guide 22 slidably along the longitudinal direction and having the detector 10, and an advance-retraction mechanism 24 for advancing and retracting the slider 23 along the longitudinal direction.

The advance-retraction mechanism 24 has a feeding threaded shaft 25 disposed in the casing 21, a nut 27 screwed to the feeding threaded shaft 25 and connected to the slider 23 through a joint 26, and a rotary drive mechanism 28 for rotating the feeding threaded shaft 25.

The feeding threaded shaft 25 is disposed in parallel to the longitudinal direction of the slider guide 22 and both ends of the feeding threaded shaft 25 are rotatably fixed to the casing 21 through a bearing.

The rotary drive mechanism 28 has a motor 29 disposed in parallel with the feeding threaded shaft 25, and first and second gear wheels 30 and 31 for transmitting normal and reverse rotation of the motor to the feeding threaded shaft 25. The feeding threaded shaft 25 and the motor 29 is attached to a mounting block 21A provided inside the casing 21.

An inner side of the slider 23 is formed in C-shape cross section and one of the mutually opposing inner sides is arranged as first reference surface. The first reference surface is abutted to an outer side (first reference surface 22A) of the slider guide 22.

For determining the position of the slider 23 and the slider guide 22 by the reference surfaces, two positioning leaf springs 32 are attached to one side of the slider 23. A pad 33 for securing a smooth sliding movement of the slider 23 relative to the slider guide 22 is attached to an opening end of the positioning leaf spring 32. The pad 33 is formed by a material having low friction coefficient, such as TEFLON (trade name: polytetrafluoroethylene).

The slider 23 has a second reference surface 23B orthogonal with the first reference surface in the C-shaped inner sides, the second reference surface 23B being abutted to an outer side (second reference surface 22B) orthogonal with the first reference surface 22A of the slider guide 22.

In FIG. 2, a retainer block 34 for preventing detachment of the slider 23 from detaching from the slider guide 22 is attached on an opening end of the slider 23 (only one side is shown in FIG. 2) by screws 35. Further, the retainer block 34 has a positioning leaf spring 36 attached by screws 37 for bringing the second reference surface of the slider 23 into contact with the second reference surface of the slider guide 22. A pad 38 for securing a smooth sliding movement of the slider 23 and the slider guide 22 is attached to the positioning leaf spring 36. The pad 38 is formed by a material having a low friction coefficient, such as TEFLON (trade name: polytetrafluoroethylene).

Figure 3:
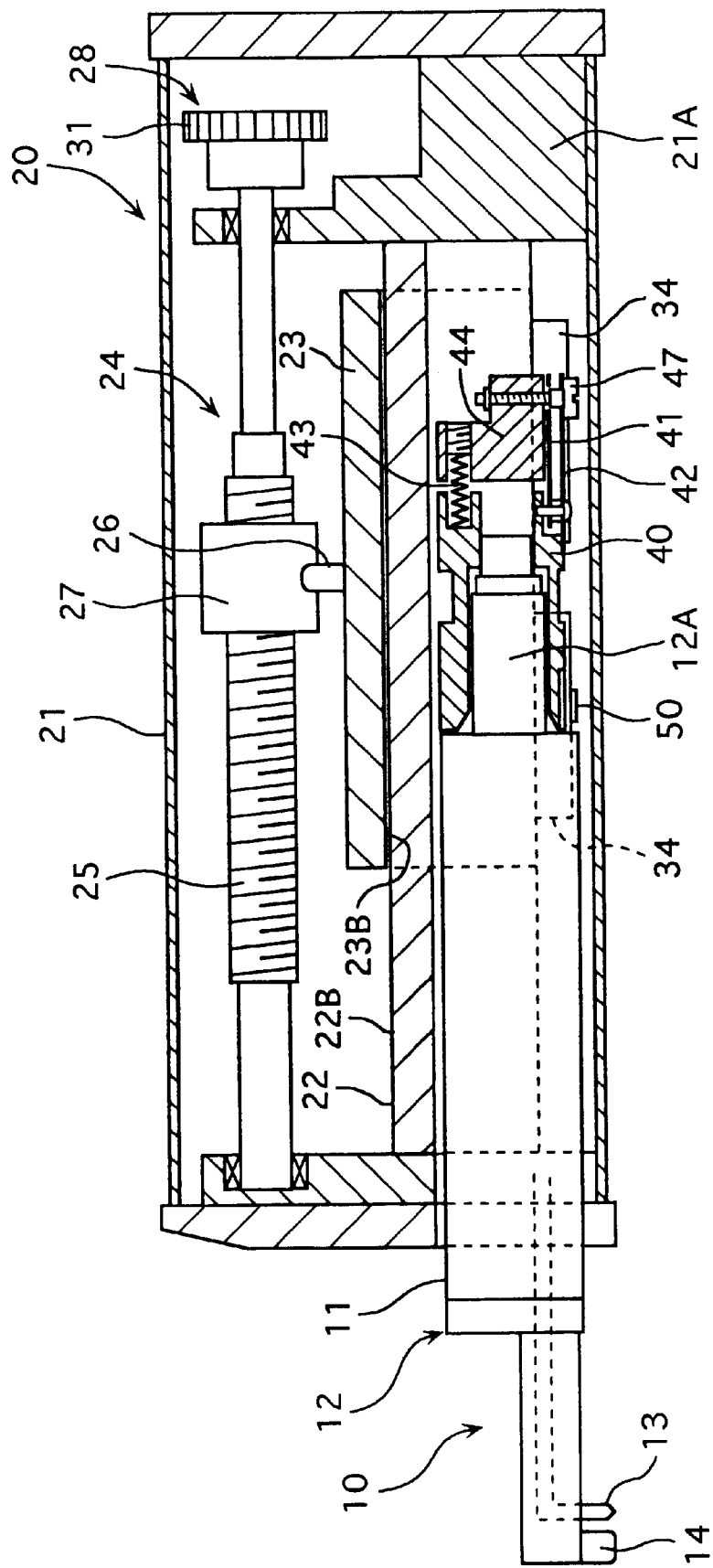
FIG. 3 is a cross section of the aforesaid embodiment.

A joint mechanism of the detector 10 and the drive unit 20 is shown in FIG. 3.

In FIG. 3, the detector 10 has a detector body 12 having an approximately cylindrical casing 11, a stylus 13 for measuring a surface texture supported inside the detector body 12 in a seesawing manner, and a skid 14 provided adjacent to the distal end of the stylus 13 attached to the detector body 12, thus detecting vertical advancement and retraction of distal end of the stylus 13 by a detecting portion (not shown) of the detector body 12.

The distal end of the stylus 13 constantly projects from a distal end of the skid 14 by a pre-load means (not shown).

The detector 10 is accommodated in an opening of the slider guide 22 along a longitudinal direction, and an end of the detector 10 is exposed from an end surface of the drive unit 20.

Further, the detector 10 includes an approximately cylindrical connector 12A provided at a base end of the detector body 12, and a connector attachment 40 detachably attached to the connector 12A.

The connector attachment 40 is connected to a drive unit attachment 44 through a first leaf spring 41, a second leaf spring 42 and a helical spring 43, wherein the drive unit attachment 44 is attached to the retainer block 34. The drive unit attachment 44 and the retainer block 34 are also included in the drive unit 20.

The connector attachment 40 and the detector 10 are rotatable around the drive unit attachment 44 and a revolving range of the connector attachment 40 and the detector 10 is restricted by a stopper 50 attached to the retainer block 34.

Figure 4:
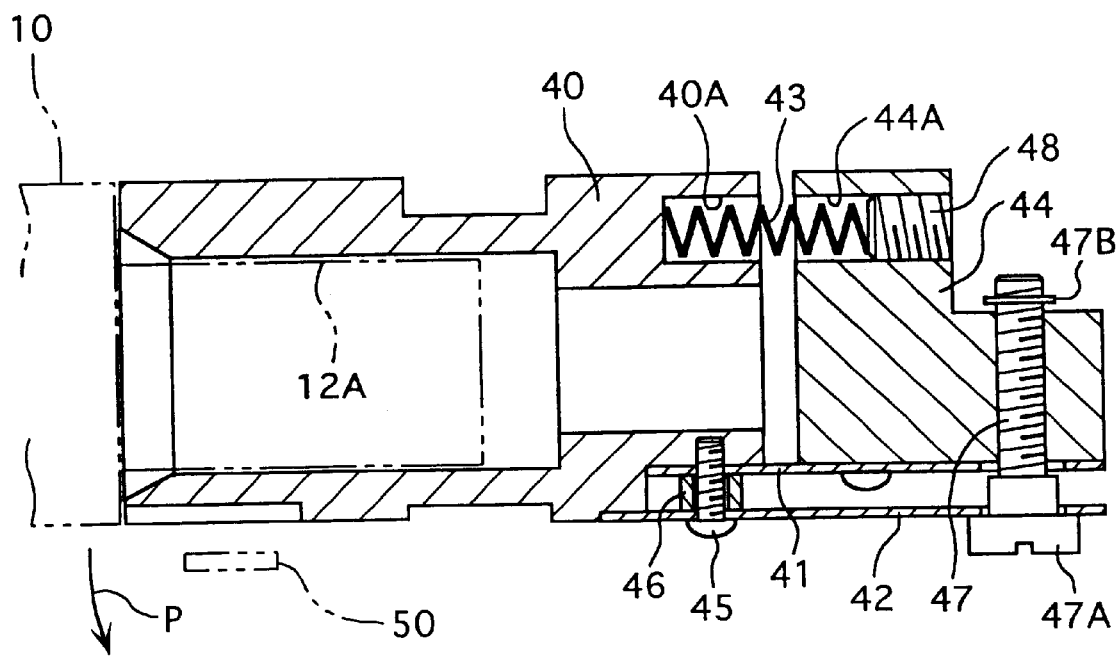
FIG. 4 is a cross section showing a primary portion of the aforesaid embodiment.
Figure 5:
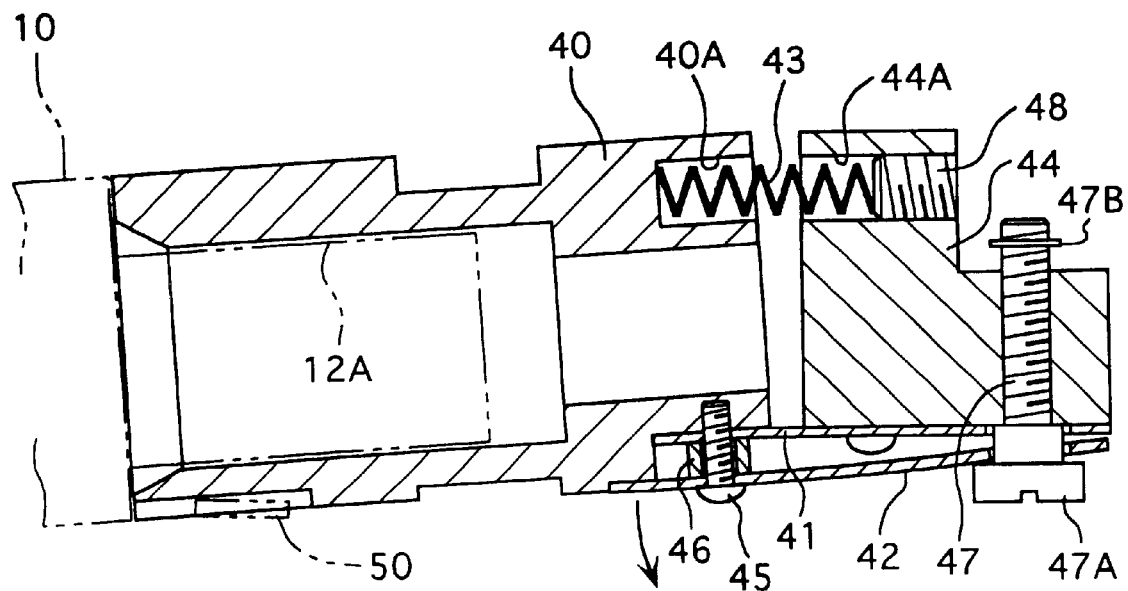
FIG. 5 is a cross section similar to FIG. 4 showing a condition for skidless measurement.

A connecting mechanism of the connector attachment and the drive unit attachment 44 is zoomed in FIGS. 4 and 5.

In FIG. 4, the first leaf spring 41 and the second leaf spring 42 rotatably bias the skid 14 in a direction P to press the skid 14 toward the measurement surface.

Among the leaf springs, the first leaf spring 41 has a first end on a side of the detector being fixed to the connector attachment 40 and the second end being fixed to the drive unit attachment 44. The first leaf spring mainly functions as a holding pre-load means for holding the detector 10.

The second leaf spring 42 is disposed in parallel with the first leaf spring 41 spaced apart at a predetermined interval, and the first end of the second leaf spring 42 is attached to the connector attachment 40 by an attachment screw 45. A spacer 46 is interposed between the first ends of the first and the second leaf springs 41 and 42, so that the first ends are mutually spaced apart at a predetermined interval.

The second leaf spring 42 functions as a pressing pre-load means for pressing the detector 10 toward the measurement surface. When the other end (second end) of the second leaf spring 42 comes adjacent to the second end of the first leaf spring 41, a spring force is generated to the first end of the second leaf spring 42, thus increasing the force for biasing the detector 10.

An adjustment screw 47 attached to the drive unit attachment 44 as a pre-load force controller is provided to the second end of the second leaf spring 42.

The adjustment screw 47 sandwiches the second ends of the first leaf spring 41 and the second leaf spring 42 between a head 47A thereof and the drive unit attachment 44. The second end of the second leaf spring 42 and the second end of the first leaf spring 41 approach and separate by adjusting the screwing amount of the adjustment screw 47.

When the adjustment screw 47 is screwed into the drive unit attachment (44) at the maximum, the second end of the second leaf spring is the most adjacent (abutted) to the second end of the first leaf spring 41, thus applying a predetermined pre-load force to the detector 10. Then, the detector 10 turns to the direction P, which is restricted by the stopper 50 (see FIG. 5). Here, the stopper 50 works as a restriction means for restricting the movement of the detector 10 in the biasing direction (rotation in the direction P) for skidless measurement.

A ring 47B for preventing detachment of the adjustment screw 47 is provided at a distal end of a threaded portion of the adjustment screw 47.

The helical spring 43 is a compression spring having a first end being engaged in a recess 40A of the connector attachment 40 and the second end being engaged in a hole 44A of the drive unit attachment 44. The spring 43 works as an auxiliary pre-load means for biasing the connector attachment 40 in a direction away from the drive unit attachment 44 (a direction for turning the detector 10 in the direction P).

A spring force adjustment screw 48 is screwed to the hole 44A of the drive unit attachment 44, and the head of the spring force adjustment screw 48 is abutted to the second end of the helical spring 43. By adjusting the screwing amount of the spring force adjustment screw 48, the length of the helical spring 43 is changed, thus adjusting the pre-load force.

A function of the above arrangement of the present embodiment will be described below.

For conducting a skidless measurement, the skid is initially detached. Subsequently, a predetermined pre-load force is applied to the detector by the adjustment screw 47.

When the adjustment screw 47 is into the drive unit attachment (44) screwed at the maximum, the second end of the second leaf spring 42 becomes mostly adjacent to the second end of the first leaf spring 41, thus biasing both of the first ends of the first leaf spring 41 and the second leaf spring 42 opposite to the screwing direction of the adjustment screw 47.

Though the connector attachment 40 and the detector 10 are turned in the direction P with a predetermined pre-load force, the connector attachment 40 is abutted to the stopper 50 connected to the biasing block 34, thus stopping movement of the detector 10 in the direction P. At this time, since the connector attachment 40 and the detector 10 are biased by the first and the second leaf springs 41 and 42 and the helical spring 43, the connector attachment 40 and the detector 10 do not turn to a direction opposite in the direction P.

Under the above condition, the measurement surface is measured by the detector 10.

The surface texture measuring instrument is set on the workpiece, and the drive unit 20 is operated to move the detector 10 while the distal end of the stylus 13 is in contact with the measurement surface.

In operating the drive unit 20, the motor 29 is actuated and the rotation of the motor 29 is transmitted to the feeding threaded shaft 25 through the first and the second gear wheels 30 and 31. When the feeding threaded shaft 25 is rotated, the nut 27 moves along an axis line of the feeding threaded shaft 25 and the slider 23 moves on the slider guide 22 in accordance with the movement of the nut 27.

The detector 10 attached to the slider 23 through the drive unit attachment 44 and the connector attachment 40 moves in accordance with the movement of the slider 23.

At this time, the stylus 13 of the detector 10 displaces in accordance with irregularity on the measurement surface of the workpiece, thus detecting all concavo-convex data on the measurement surface by the detecting portion of the detector 10.

On the other hand, when the measurement is conducted with the skid 14, the screwing amount of the adjustment screw 47 is loosened, thus applying a pre-load force less than the predetermined value.

Then, though the skid 14 is biased by the pre-load force generated to the detector 10, the movement of the detector 10 in the biasing direction is not restricted by the stopper 50.

In the above condition, the surface texture measuring instrument is set on the workpiece and the drive unit 20 is operated to move the detector 10 while the distal end of the stylus 13 and the skid 14 are in contact with the measurement surface.

The skid 14 is displaced along the waviness of the measurement surface and the displacement of the stylus 13 relative to the skid 14 is detected as a data, such as surface roughness.

According to the present embodiment, the following effects can be obtained.

In the present embodiment, since the surface texture measuring instrument comprises the detector 10 having the stylus 13 and the skid 14 at the distal end thereof, the drive unit 20 for moving the detector 10 along the measurement surface, the pre-load means 41 and 42 for biasing the detector 10 to press the skid 14 against the measurement surface, and the pre-load force controller 47 for adjusting the pre-load force of the pre-load means 41 and 42, the pressing force of the skid 14 can be easily controlled by operating the pre-load force controller 47.

Therefore, when the skid is exchanged into a different type, the pressing force of the skid 14 can be controlled in accordance with the type of the exchanged skid.

Further, since the surface texture measuring instrument of the present embodiment has the restriction means 50 for restricting the movement of the detector 10 in the biasing direction when the predetermined pre-load force is applied to the pre-load force controller 47, the skid measurement and the skidless measurement can be easily switched by operating the pre-load force controller 47.

Further, since the pre-load means comprises the holding pre-load means 41 for mainly holding the detector 10 and the pressing pre-load means 42 for pressing the detector 10 against the measurement surface, the pre-load force of the detector 10 can be easily adjusted by securing a minimum pre-load force by the holding pre-load means 41 and by adjusting the pre-load force by the pressing pre-load means 42.

Further, since the holding pre-load means 41 and the pressing pre-load means 42 comprises the first and the second leaf springs, the structure of the pre-load means itself can be simplified. Since the leaf spring is popularly used for measuring instruments and can be obtained relatively inexpensively, the production cost of the measuring instrument can be reduced.

Further, since the pre-load force controller is composed of an adjustment screw for moving the second end of the second leaf spring 42 toward and away from the second end of the first leaf spring 41, the pre-load force of the detector 10 can be easily controlled by adjusting the screwing amount of the adjustment screw 47.

Further, since the restriction means 50 is a stopper for restricting the movement of the detector 10 in the biasing direction when the pre-load force of the detector 10 is increased by screwing the adjustment screw, the structure itself can be simplified.

Since the surface texture measuring instrument includes the auxiliary preload means 43 for biasing the distal end of the detector 10 toward the measurement surface, the pre-load force applied to the detector 10 can be minutely adjusted by the auxiliary pre-load means 43 in addition to the pre-load means 41 and 42.

Further, since the slider 23 holding the detector 10 is advanced and retracted along the slider guide 22 and the slider guide 22 has the first and the second reference surfaces in contact with the slider 23, a higher rigidity can be maintained as compared to forming the slider guide with a circular rod member.

Accordingly, linearity of the moving direction of the detector 10 advanced and retracted along the slider guide 22 can be secured.

Further, since the slider 23 is constantly biased toward the reference surface of the slider guide 22 by the positioning leaf springs 41 and 42, the position of the slider 23 can be maintained constant even when a clearance is formed between the slider 23 and the slider guide 22.

Accordingly, the change in orientation of the slider 23, i.e. the detector 10, by the clearance of the slide portion can be prevented.

Since the slider guide 22 and the slider 23 are formed in approximately C-shaped cross section, high rigidity can be attained.

Since the slider guide 22 is integrally fixed to the casing 21, the rigidity of the casing 21 can be strengthened by the slider guide 22.

Incidentally, the scope of the present invention is not restricted to the above embodiment, but includes modification and improvements as long as an object of the present invention can be attained.

For instance, though the pre-load means of the above embodiment includes the holding pre-load means 41 for mainly holding the detector 10 and the pressing pre-load means 42 for pressing the detector 10 toward the measurement surface, only a single pre-load means may be provided in the present invention.

When the pre-load means is composed of the holding pre-load means 41 and the pressing pre-load means 42, the pre-load means may not be composed of the leaf spring. For instance, a helical spring may be used instead of the leaf spring.

Further, though the adjustment screw 47 is used as the pre-load means controller, the motor and wheel gear mechanism may be used for automatically adjusting the pre-load force of the pre-load means.

Further, the auxiliary pre-load means 43 may not be provided. However, even when the auxiliary pre-load means 43 is provided, the leaf spring may be used instead of the helical spring.

Further, in the present embodiment, the slider 23 holding the detector 10 may be advanced and retracted by a slider guide composed of a circular rod member.

Further, the movement of the detector 10 may be restricted by biasing the detector 10 in a negative biasing direction and by pressing the connector attachment 40 to the drive unit attachment 44.

Further, the biasing controller may mutually connect or fit the connector attachment 40 to the drive unit attachment 44.

What is claimed is:

1. A surface texture measuring instrument, comprising:
    a detector having a stylus for measuring a surface texture and a detachable skid at a distal end thereof;
    a drive unit for moving the detector along a measurement surface;
    a pre-load means for biasing the detector to press the skid onto the measurement surface;
    a pre-load force controller for controlling a pre-load force of the pre-load means; and
    a restriction means for restricting a movement of the detector in a direction of the pre-load force when the pre-load force controller applies a predetermined pre-load force to the detector, thus conducting a skidless measurement.

2. The surface texture measuring instrument according to claim 1, the pre-load means comprising a holding pre-load means for holding the detector and a pressing pre-load means for pressing the detector against the measurement surface.

3. The surface texture measuring instrument according to claim 2, wherein the holding pre-load means and the pressing pre-load means are first and second leaf springs with first ends secured to either one of the detector or the drive unit at a predetermined gap and the second ends attached to the other one of the detector or the drive unit, wherein the pre-load force controller is an adjustment screw for moving the second end of the second leaf spring toward and away from the first leaf spring to adjust the pre-load force of the detector against the measurement surface, and wherein the restriction means is a stopper for restricting the movement of the detector in a biasing direction of the detector when the pre-load force of the detector is increased by screwing the adjustment screw in a direction to move the second end of the second leaf spring toward and away from the second end of the first leaf spring.

4. The surface texture measuring instrument according to claim 1, further comprising an auxiliary pre-load means for biasing the skid toward the measurement surface.

5. The surface texture measuring instrument according to claim 4, wherein the auxiliary pre-load means is a helical spring provided between the detector and the drive unit.

* * * * *